Patented Dec. 5, 1944

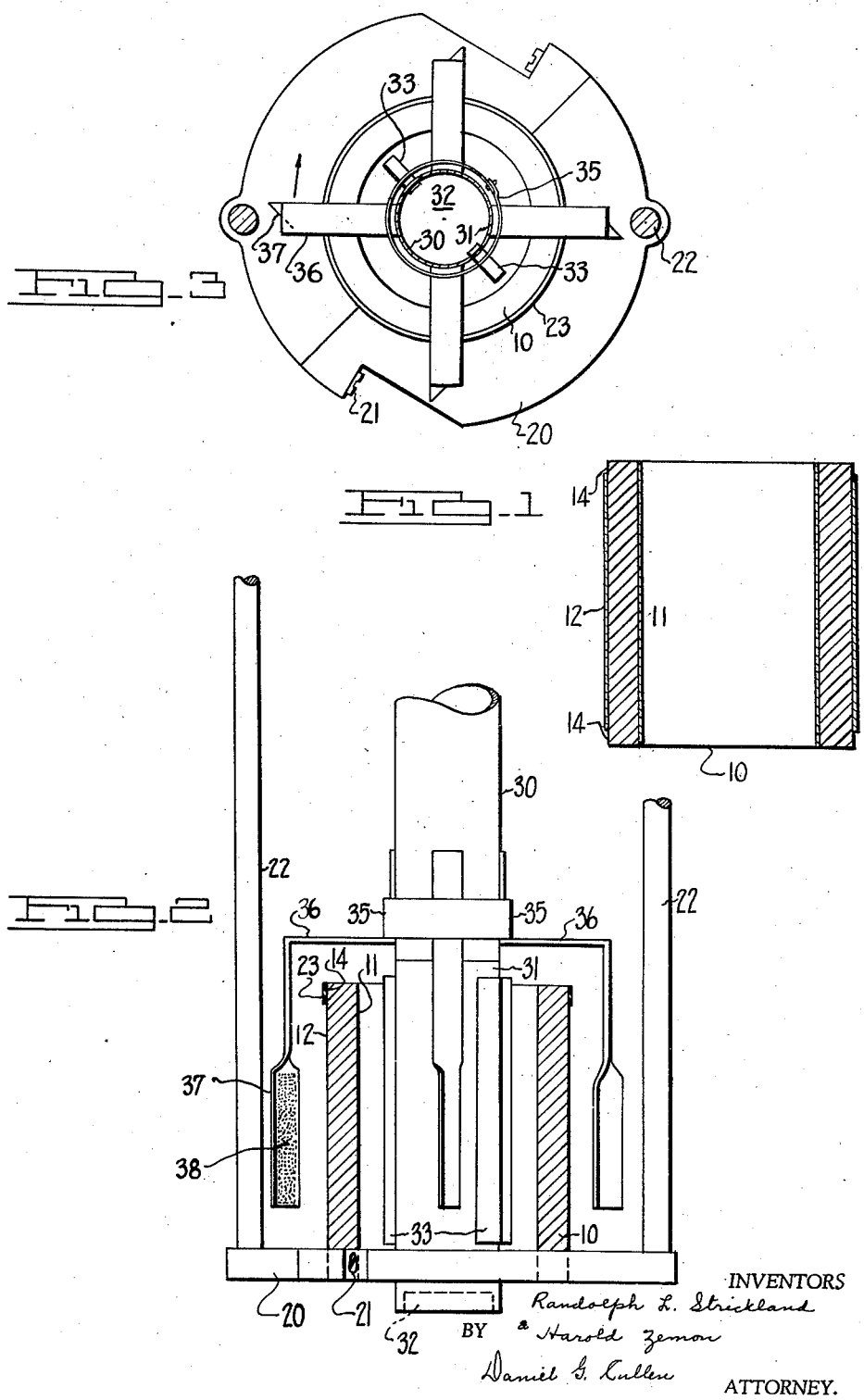

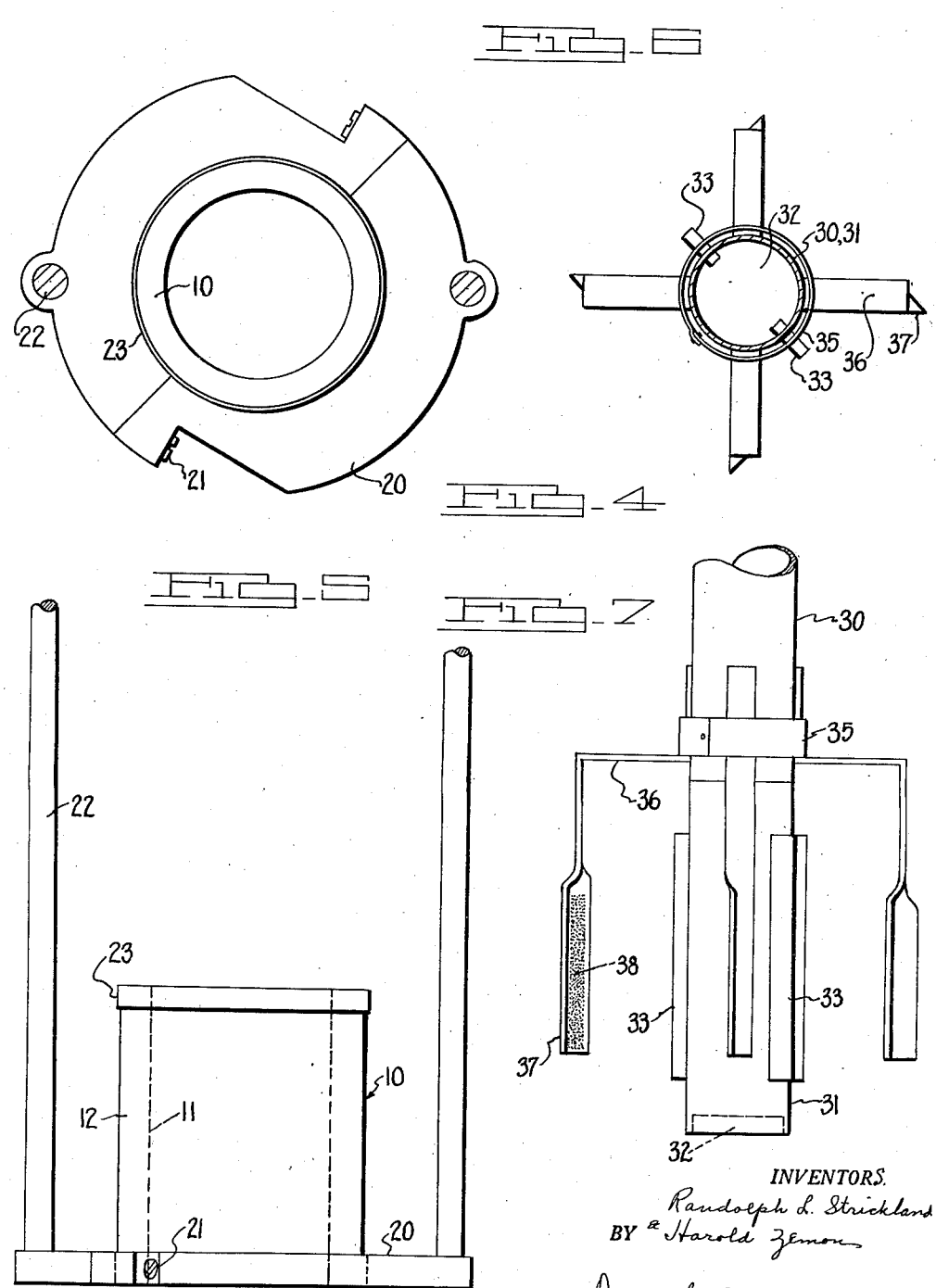

2,364,564

UNITED STATES PATENT OFFICE 2,364,564

APPARATUS FOR ELECTROPLATING

Randolph L. Strickland and Harold Zemon, Detroit, Mich., assignors to Detroit Aluminum and Brass Corp., Detroit, Mich., a corporation of Michigan Application March 13, 1943, Serial No. 479,030

1 Claim. (Cl. 204—272)

This application relates to apparatus for electroplating.

More specifically this application discloses apparatus for simultaneously plating the inside and outside surfaces of a tube. Such apparatus is disclosed in the appended drawings.

In these drawings:

Fig. 1 shows a tube to be plated, the surfaces to be plated being indicated by heavy lines.

Figs. 2–8 show the apparatus.

Fig. 1 shows a tube 10 whose inner surface 11 and a broad stripe 12 of whose outer surface are to be plated simultaneously, leaving unplated the narrow annular stripes 14 of the outer surface.

The support for the tube 10 comprises a split ring 20 whose halves are inter-secured by clamping bolts 21 and which has supporting rods 22 secured thereto, the ring surrounding the tube 10 at a lower one of the stripes 14, the latter thus being blocked off by the ring 20. An electric circuit to the tube 10 from any suitable terminal is conducted through either or both supporting rods 22 and the ring 20 which may be of conducting material, such as steel, not soluble in the electrolyte, or it may be of insulating material with a conducting strap provided thereon to establish a conducting path between the tube 10 at stripe 14 and a post or rod 22.

When the tube 10 is disposed within the clamping ring 20 it will project upwardly therefrom as indicated leaving exposed the inner surface 11, the stripe 12, and the upper stripe 14. The latter may be blocked off by any suitable means such as a rubber band 23 so that only the surfaces 11 and 12 are exposed.

The anode consists of a body 30 in the form of a steel tube to whose lower end is secured a tube 31 plugged at its lower end by any suitable plug 32. The tube 31 is adapted to contain material with which the tube 10 is to be plated and is formed porous so that contact can be made between the electrolyte and the material within tube 31. Formed on tube 31 are blades or paddles 33 for stirring and for circulating the electrolyte.

Clamped to the steel tube 30 by a split clamping ring 35 are several ogee shaped anode elements 36 whose lower ends 37 project downwardly to be more or less parallel to the axis of tubes 10—30—31, being deflected as indicated to serve as paddles or agitators for the electrolyte.

The elements 36 are in electrical contact with the anode tube 30 where they engage such tube and tube 30 is connected to a terminal to serve as an anode. All except the areas indicated at 38 on the inner lower surfaces of the elements 36—37 are coated with insulation so that inner areas 38 only are in electrical contact with electrolyte. The areas 38 determine the thickness of plating on stripe 12 of tube 10.

The anode, consisting of tubes 30—31 and elements 36, may be telescoped into and around a tube 10 seated in ring 20 so that the porous tube 31 will face the inner surface 11 of tube 10 and so that areas 38 will face the outer stripe 12 of tube 10 with all of the parts shown immersed in electrolyte. With the anode revolving on its axis, and with ordinary plating requirements being met, surfaces 11 and 12 of the tube 10 will be electroplated simultaneously.

The work support comprising ring 20 and rods 22 is believed to be a novel work support or arrangement for the purposes herein described.

The addition to the anode of elements 36 permitting simultaneous plating of the inner and outer surfaces of tube 10 is also believed to be new, for whereas anodes consisting of tubes 30—31 have been used for plating the interior of a tube, it is not believed that such anodes have been equipped with anode elements 36 to permit the outer surfaces 12 to be plated simultaneously with the inner surface 11.

Now having described the plating apparatus herein disclosed reference should be had to the claim which follows for a determination of the invention hereof.

I claim:

Apparatus for electroplating the inside and outside of a tube simultaneously comprising a tube support and an anode assembly, the tube support being of a character to leave exposed the surfaces of the tube to be plated, the anode assembly consisting of a body whose lower end is adapted to be disposed within the upper end of the tube, and supplementary elements secured at the upper end only to said body at a point above the tube and adapted to be disposed around the upper end of the tube outside of it, the anode assembly moving as a unit during the positioning of the tube and the anode assembly for plating.

RANDOLPH L. STRICKLAND.
HAROLD ZEMON.